United States Patent
Starcevich et al.

(10) Patent No.: US 6,447,840 B1
(45) Date of Patent: Sep. 10, 2002

(54) METHOD FOR PRODUCING AN INTRA-LAMINAR STRUCTURAL MATRIX WITHIN A HOMOGENEOUS COMPOSITE LAYER AND APPARATUS PRODUCED THEREBY

(75) Inventors: Bradley K. Starcevich, Canton; Richard E. Stahr, Elgin, both of IL (US)

(73) Assignee: Cougar Package Designers, Inc., West Chicago, IL (US)

( * ) Notice: Subject to any disclaimer, the term of this patent is extended or adjusted under 35 U.S.C. 154(b) by 0 days.

(21) Appl. No.: 08/997,315

(22) Filed: Dec. 23, 1997

Related U.S. Application Data

(60) Provisional application No. 60/033,913, filed on Dec. 23, 1996.

(51) Int. Cl.[7] .......................... B32B 27/02; B32B 27/12
(52) U.S. Cl. .................... 427/133; 427/209; 427/430.1; 442/63; 442/43; 442/44
(58) Field of Search .................... 442/63, 251, 254, 442/249, 267, 244, 246, 44; 427/430.1, 209, 133

(56) References Cited

U.S. PATENT DOCUMENTS 4,637,940 A * 1/1987 Long .......................... 427/209
5,593,767 A * 1/1997 Noda et al. .................. 428/901

FOREIGN PATENT DOCUMENTS

FR        1471270 A  *  3/1967

* cited by examiner

*Primary Examiner*—Elizabeth M. Cole
(74) *Attorney, Agent, or Firm*—Baniak Pine & Gannon

(57) ABSTRACT

A method for creating an intra-laminar matrix within a homogeneous layer enhances the overall structural integrity of a composite layer or layers is disclosed and a composite made thereby. This enhanced structural integrity is provided by reducing and/or eliminating requisite bonds and/or by reducing and/or eliminating heterogeneous layers by rendering them unnecessary in the composite construction formed by the method of the invention.

5 Claims, 5 Drawing Sheets

Mechanical Test Results

Compression Test

| CFSR | ULOAD (Lbs.) | USTRESS (psi/in.^2) | MODULUS (x 10^6 psi) |
|---|---|---|---|
| | 4,032.000 | 17,590.000 | 2.050000 |
| | 4,048.000 | 18,830.000 | 1.800000 |
| | 3,628.000 | 16,150.000 | 1.830000 |
| Average | 3903 | 17523 | 1.89333 |
| STD | 194 | 1095 | 0.111455 |
| %VAR | 4.98% | 6.25% | 5.89% |

Tensile Test

| TFSR | ULOAD (Lbs.) | USTRESS (psi/in.^2) | MODULUS (x 10^6 psi) |
|---|---|---|---|
| | 611.000 | 1,703.000 | 1.800000 |
| | 942.000 | 2,642.000 | 2.780000 |
| | 697.000 | 1,963.000 | 2.210000 |
| Average | 750 | 2103 | 2.263333 |
| STD | 140 | 396 | 0.401857 |
| %VAR | 18.70% | 18.83% | 17.76% |

Flexural Test

| FFSR | ULOAD (Lbs.) | USTRESS (psi/in.^2) | MODULUS (x 10^6 psi) |
|---|---|---|---|
| | 74.000 | 9,015.000 | 1.893439 |
| | 71.00 | 9,392.000 | 1.667094 |
| | 84.000 | 8,985.000 | 1.815301 |
| Average | 76 | 9131 | 1.791945 |
| STD | 6 | 185 | 0.093869 |
| %VAR | 7.28% | 2.03% | 5.24% |

FIG. 7

COMPRESSION TEST

| LOR | ULTIMATE LOAD | ULTIMATE STRESS | MODULUS |
|---|---|---|---|
| Specimen – 1 | 3,301 | 23,748 | 2.760441 |
| Specimen – 2 | 3,142 | 23,137 | 2.692486 |
| Specimen – 3 | 3,586 | 26,233 | 2.687731 |
| Specimen – 4 | 3,603 | 26,357 | 2.768863 |
| AVERAGE | 3,408 | 24,869 | 2.727380 |
| STD. DEV. | 225 | 1,666 | 0.043218 |
| % VARIANCE | 6.60% | 6.70% | 1.58% |

TENSILE TEST

| LOR | ULTIMATE LOAD | ULTIMATE STRESS | MODULUS |
|---|---|---|---|
| Specimen – 1 | 2,048 | 15,480 | 2.847385 |
| Specimen – 2 | 2,020 | 14,712 | 2.584185 |
| Specimen – 3 | 2,178 | 16,488 | 2.566091 |
| Specimen – 4 | 2,462 | 17,157 | 2.586828 |
| AVERAGE | 2,177 | 15,959 | 2.646122 |
| STD. DEV. | 202 | 1,080 | 0.134491 |
| % VARIANCE | 9.28% | 6.77% | 5.08% |

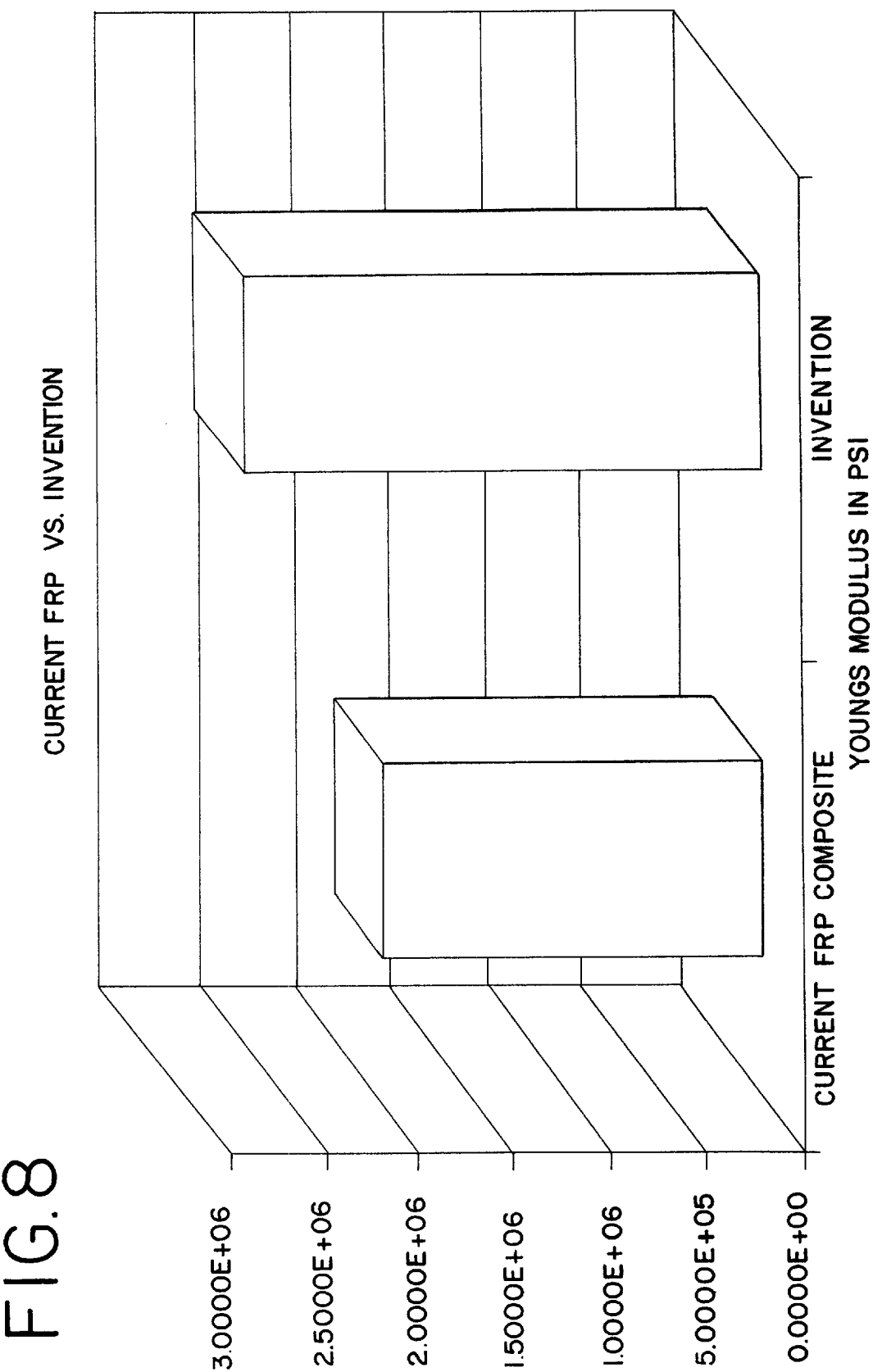

METHOD FOR PRODUCING AN INTRA-LAMINAR STRUCTURAL MATRIX WITHIN A HOMOGENEOUS COMPOSITE LAYER AND APPARATUS PRODUCED THEREBY

RELATED PRIORITY APPLICATION

This application claims the priority benefit of U.S. Provisional Application No. 60/033,913, filed Dec. 23, 1996.

FIELD OF THE INVENTION

This invention is directed generally to the field of composite materials and more specifically to such materials which utilize intra-laminar structural and nonstructural connecting matrices.

BACKGROUND OF THE INVENTION

A "composite material" is generally defined as something formed of distinct parts with respect to the field of material science.

A wide variety of types of composites include the following example:

A layer of 0.125-inch polyester resin impregnated woven roving is catalyzed with approximately 1% ->2% organic peroxide, to which has been previously layered 18-gauge cold rolled steel. A third layer is applied which consists of 0.125-inch fiberglass matting that has been pre-impregnated with polyester resin which is subsequently catalyzed with 1%->2% organic peroxide. A fourth (and final) layer of 18-gauge cold rolled steel is added.

Upon completion of this catalytic process, a multi-layer material is produced.

This exemplary composite provides a good illustration of a historical, yet current example in this field of endeavor. Completion of the above catalytic process provides a composite material that forms the basis of a raw material, or would in itself provide a raw material with which to construct, build, or otherwise be utilized as either a major or minor raw material in the construction of other materials or items.

Composites were originally conceived to provide a method for utilizing the optimum performance characteristics of each respective component in unison with each other in order to yield a new material which embodies the cumulative advantages of each respective component. Thus, a comprehensive understanding of the intended final application of the composite is essential during the design and engineering stage of the composite material itself, specifically, when choosing the appropriate components and bonding technologies that it is expected, should best meet the final design criteria.

This ability to engineer performance characteristics into the very base ("raw") materials that make up a product has resulted in an enormous variety of composite constructions. Today, one can find various constructions of composites in virtually every manufactured product. Raw materials that are used to construct components include, but are not limited to, ferrous and non-ferrous metals, plastics and polymers of all types, silicates, meta-silicates, resins, adhesives and glues, various fabrics, and many other materials. It is this ability to effectively combine various materials of practically all types that had led to the wide use of composites in virtually all areas of construction, from toys to jet fighters.

Currently, composites are constructed in such a manner that each layer of the composite is separate and distinct from other layers, as a combination of heterogeneous materials. These layers are joined to each other by various means, such as glues and adhesives, welds, catalytic action, as well as other methods. In virtually all cases, the composite construction consists of distinctively heterogeneous layers joined at their respective surfaces, resulting in a co-planar bond geometry.

Even in view of this advanced state of the art two factors have heretofore limited the performance and application of composites; specifically, these limiting factors are:

1. marginal bond integrity between heterogeneous layers; and
2. inability to enhance strength within homogeneous layers.

It is believed that marginal bond integrity is based, to a large degree, on limitations inherent to a co-planar bond geometry. More precisely, a co-planar bond geometry by definition yields a bond that exists in only two dimensions, namely the "X" dimension and the "Y" dimension perpendicular to the "X" dimension coplaner with either composite layer 12, 14 of the composite article 10 shown in FIG. 1. Specifically, all bonding of adjacent homogenous and heterogeneous layers must occur within the limitations of their respective opposing symmetric surfaces. Thus, one can dimensionally model a co-planar bond geometry between two adjacent layers by the following Equation 1:

$$A_{bnd} = (x_{dim} Y_{dim}) \times 2 \qquad \text{(Equation 1)}$$

Where:

$A_{bnd}$ is Quantity of bond $x_{dim}$ is Dimension "x"

$y_{dim}$ is Dimension "y".

Additionally, Equation 2 provides an equation which models laminar bond(s) quantitatively for any composite construct consisting of more than two layers, as follows:

$$A_{bnd} = B_{tot}(x_{dim} y_{dim}) \text{ is Quantity of bond} \qquad \text{(Equation 2)}$$

where:

$L_{tot}$ is Total composite layers $B_{tot} = (L_{tot}-1) \times 2$ is Total laminar bonds.

It is important to note that in both of the models represented in Equations 1 and 2 with reference to FIG. 1, no reference is made to the third dimension commonly referred to as "Z" perpendicular to the X-Y plane. Specifically, bonding occurs as a direct consequence of the cumulative sum of the following three factors:

i. mechanical adherence or chemical (molecular) linkage of the bonding agent to the surface of the immediately adjacent layer 12; plus ii. mechanical and chemical properties indigenous to the bonding material(s) or method(s); plus iii. mechanical adherence or chemical (molecular) linkage of the bonding agent to the surface of the immediately adjacent layer 14.

Thus, bond integrity depends upon all three of these factors i–iii, above, to a large degree. Although it is known that many factors influence bond integrity, such as chemical contamination and subsequent degradation, poor surface preparation, and substandard manufacturing processes, bond integrity is further affected by one or more of these factors. Furthermore, the inventors of the present invention consider the thickness (hereinafter referred to as the "Z" dimension) of the bond layer relatively trivial in a relativistic analysis of two-dimensional surface bonding according to the teachings of the related art. However, in a comprehensive analysis of a three-dimensional intra-laminar matrix/bond profile described later according to the present invention, the dimension "Z" is of great importance.

Thus, the prior art has heretofore failed to recognize, let alone sufficiently address mechanical performance (generically referred to as "strength") within homogeneous layers which is yet another limiting factor of prior art composite technology. Moreover, the prior art fails to address means for mechanically enhancing the physical properties of a homogenous layer of composite material without creating a distinct and, therefore, heterogeneous, additional layer, which would provide an important solution to a well-known problem in the material sciences art. An historical example of this is the three-layered composite consisting of:

Polyester resin impregnated fiberglass fabric laminated on each of its major surfaces to a thinner layer of ceramic (generic) material, of which all three layers are simultaneously catalyzed with 1% ->2% organic peroxide.

In the above example, the polyester resin impregnated fiberglass is utilized solely as a means of reinforcing, and also providing additional strength to the overall composite. However, two additional heterogeneous layers, and their inherent disadvantages, have been created in the process. Specifically, adding the reinforcing layer creates the need to effectively bond two sets of two co-planar surfaces to each other, hence creating six additional opportunities for bond failure to occur in the resulting composite construction (See FIG. 5).

To summarize, prior art composite technologies suffer from a number of important disadvantages:

i. an absence of an industrially acceptable method for producing an intra-laminar structural matrix within a homogeneous composite layer;

ii. an absence of industrially acceptable mechanical methods of enhancing the mechanical performance characteristics of a homogeneous layer via modification of the homogeneous composite layer;

iii. current bonding technology, with the exception of some known welding techniques, is essentially two-dimensional, and thus limited in mechanical bonding effectiveness; and iv. each additional reinforcing layer within a composite construct results in two sets of two co-planar surfaces that require bonding, thereby yielding six additional opportunities for potential inferior bond integrity. Poor bond integrity ultimately produces delamination of the native composite layers.

SUMMARY OF THE INVENTION

Accordingly, the present invention is directed to overcoming the above-identified deficiencies in the prior art, by, among other things:

(a) providing a method for mechanically creating an intra-laminar structural matrix within a homogeneous composite layer, subsequently making it possible for one;

(b) providing a method of enhancing the mechanical performance characteristics of a homogeneous layer via modification of the homogeneous composite layer;

(c) providing a method of creating a true three-dimensional bond, thus significantly advancing the state of the art bond technology with respect to composite materials; and (d) providing a method of reducing or, in some cases, eliminating extraneous sets of co-planar surfaces that require bonding, thus significantly reducing opportunities for potential inferior bond integrity and subsequent delamination of the resulting composite construction.

Further objects and advantages of the present invention are to provide composite materials which exhibit improved performance characteristics, are easier and less expensive to manufacture, and are inherently more reliable by virtue of enhanced cohesiveness and overall structural integrity.

Yet additional objects and purposes of the present invention and apparatus manufactured by the method of the present invention will be apparent to persons familiar with this field of endeavor in view of the following description, drawing figures and claims.

BRIEF DESCRIPTION OF THE DRAWINGS

FIG. 6 is a table of mechanical test results for conventional bonding technology without the intra-laminar structures of the present invention;

FIG. 7 is a table of mechanical test results according to the method of the present invention; and FIG. 8 is a graphical representation of selected mechanical properties of the present invention in direct comparison with the prior art.

DETAILED DESCRIPTION OF THE INVENTION

Figure 1:
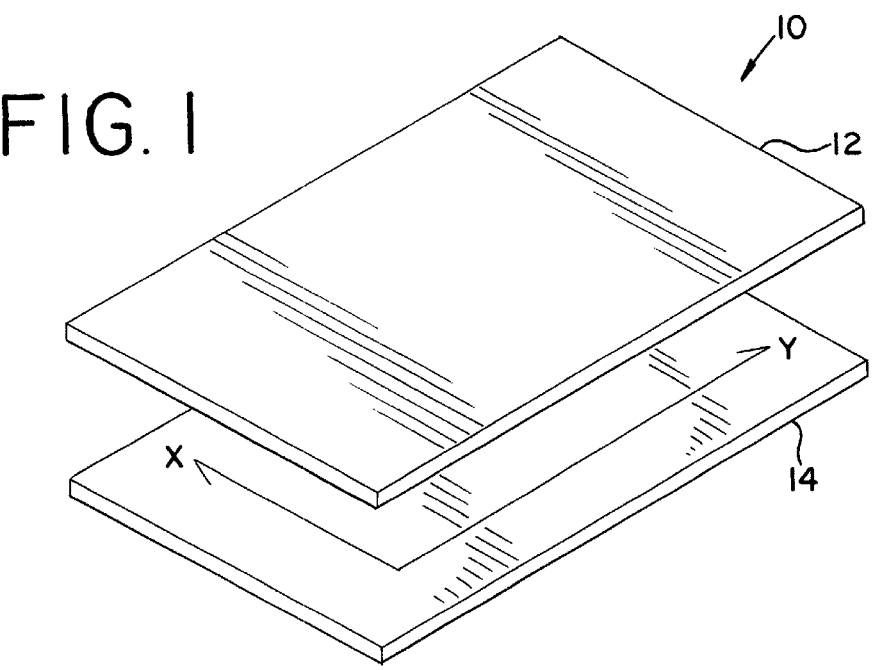
FIG. 1 is a perspective, exploded view of two composite layers of an exemplary prior art composite construction and demonstrating a co-planar bond geometry.
Figure 2:
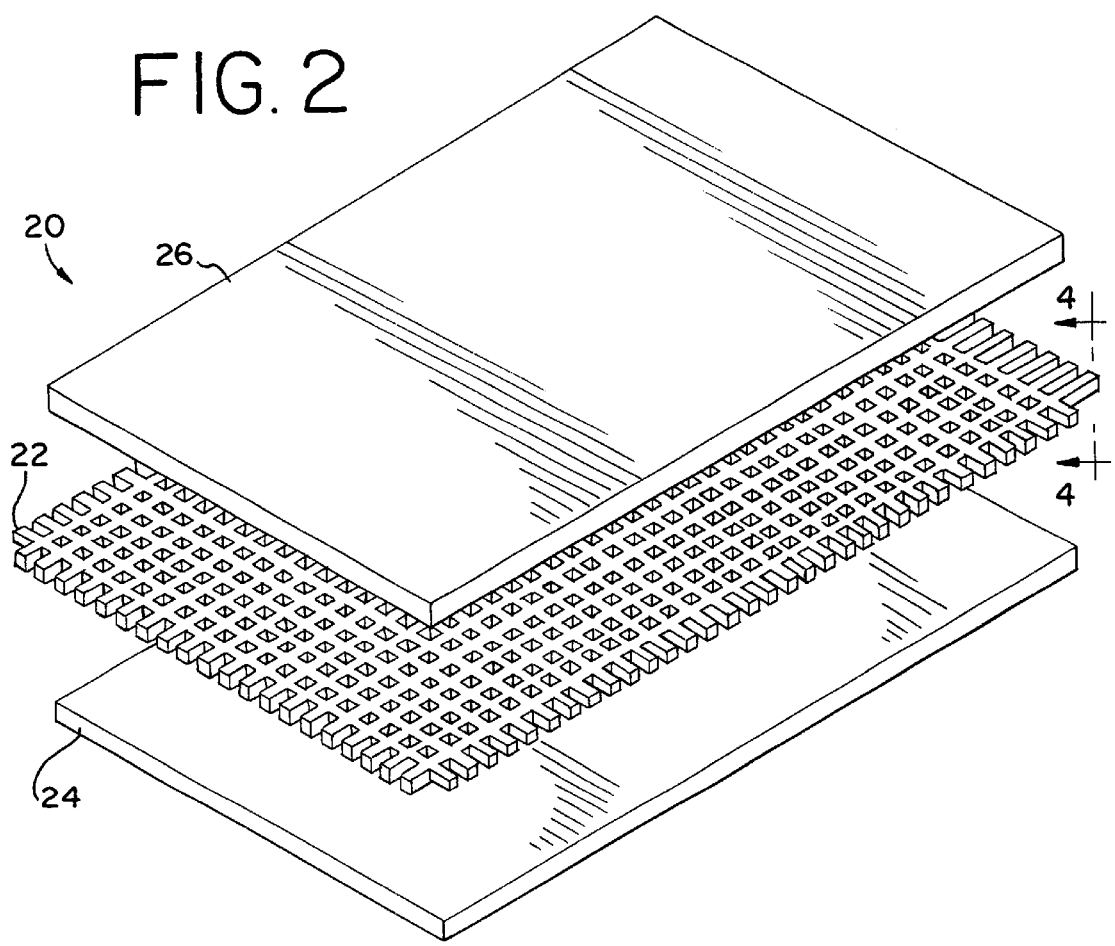
FIG. 2 is a perspective, exploded view of a "matrix template" positioned between two homogeneous composite laminae, according to the present invention.
Figures 3, 4, 5:
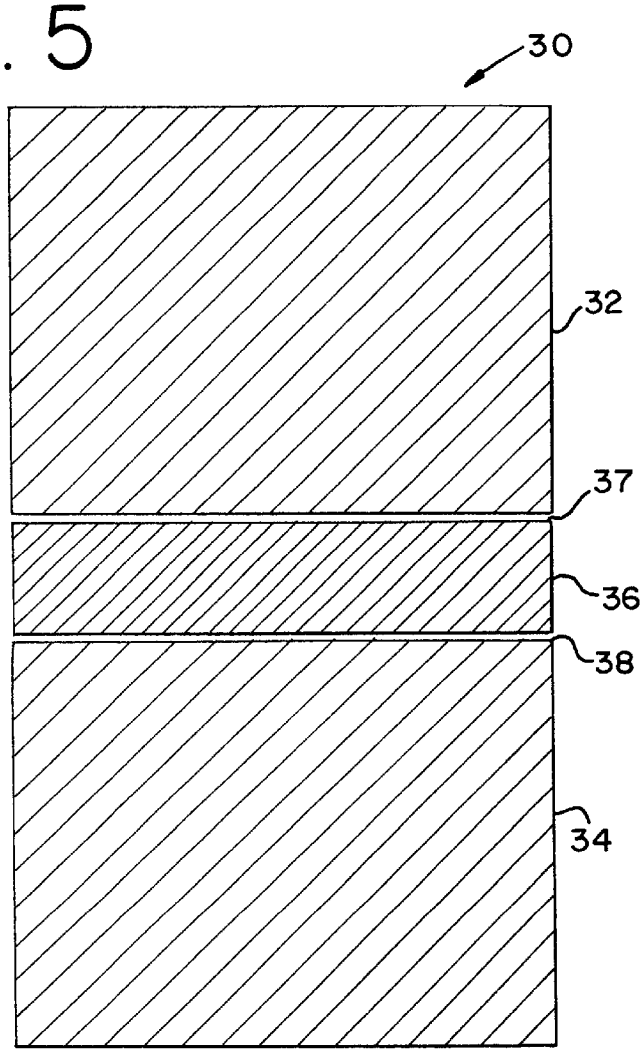
FIG. 3 is a sectional view of a typical embodiment of the invention.
FIG. 4 is a sectional view taken along line 4—4 of FIG. 2, showing a complete homogeneous composite containing an intra-laminar matrix and template according to the invention.
FIG. 5 is a sectional view of another composite bond technology, showing a plurality of potential delamination points between composite layers.

The present invention will be described hereinafter with reference to the accompanying drawings. A typical embodiment of the present invention is illustrated in FIGS. 2—4, illustrating laminar portions of the same homogeneous layer. FIG. 5 shows individual members of the intra-laminar matrix, and their relationship to the laminar portions shown in FIGS. 3 and 4. FIGS. 2 and 4 each depict three-dimensional views of the template used to create the intra-laminar structural matrix.

As previously described, Equation 1 models bond geometry in two-dimensional plane space. Equation 2 models bond geometry in two-dimensional plane space, and differs slightly from the Equation 1 model because it illustrates, quantitatively, bond geometry with respect to the number of composite layers.

The following Equation 3 symbolically models bond geometry quantitatively in three-dimensional space for any number of composite layers.

Where:

$r$ is Radius of interconnecting Structural Matrix Component h is Height of interconnecting Structural Matrix Component $Z_{dim}$ is Dimension "Z"

$x_{qty}$ is Quantity of interconnecting Structural Matrix Components contained within a given X axis.

$y_{qty}$ is Quantity of interconnecting Structural Matrix Components contained within the Y axis relative to the X axis above.

Then:

$$A_{bnd} = B_{tot}[(x_{dim}y_{dim}z_{dim})2] + \qquad \text{(Equation 3)}$$
$$[(x_{qty}y_{qty})(\pi 2r)(h)] - \left[(x_{qty}y_{qty})\left(\frac{1}{2}\pi r^2\right)2\right]$$

Simplified, Equation 3 can be reduced to:

$$A_{bnd}=2\times B_{tot} \times_{dim}y_{dim}z_{dim}+2x_{qty}y_{qty}\pi rh-x_{qty}y_{qty}\pi r^2 \qquad \text{(Equation 4)}$$

In a typical embodiment 20 shown in FIG. 2, the material which constitutes the portions shown in FIGS. 2–5 consists of a homogeneous material made of a mixture of polyester resin and a powdered mineral, which is subsequently catalyzed with 1% ->2%, by weight, of organic peroxide or any other polyester resin compatible catalyst. Prior to completion of catalysis, the previously described material is in a heavily viscous, liquid form. The liquid material is applied to a mold in a thin layer between 0.062-inch to 0.5-inch thick. Next, the intra-laminar matrix template 22 as depicted in FIG. 2 is applied over the still liquid material. In a typical embodiment, this template would consist of woven fiberglass fabric. It is a major object of this invention that the fabric comprising the template be woven in such a fashion that the space between each group of respective elements in the weave be at least 0.010-inch and no greater than 0.10-inch apart, thereby providing a dimensional profile that yields a void closely proximate to the formula "Inside Template Dimensions=Outside Matrix Dimensions." The woven fabric is applied in such a fashion as to allow the liquid to permeate throughout the fabric. Next, subsequent layers 24, 26 of the material previously described above is applied over the intra-laminar matrix template. Upon completion of catalysis, a homogeneous composite material with a structural intra-laminar matrix is produced.

In the preferred embodiment, the material which constitutes the portions shown in FIGS. 2–4 consists of a homogeneous material made of a mixture of polyester resin (such a material is available from Reichold Chemicals, 525 N. Broadway, New York, N.Y. 10603, as their product number "UN 1866"), and the mineral calcium meta-silicate, commonly referred to as "Wollastonite." Specifically, the preferred embodiment consists of Wollastonite that has an aspect ratio of between 15:1 and 20:1, the higher aspect ratio being preferred according to the invention. Additionally, the mineral is surface-modified with a methacrylate functional silane. Such a material is available from NYCO Minerals, Inc., 124 Mountain View Drive, Willsboro, N.Y. 12996-0368, under the trade name "NYAD G Wollastocoat 1002." This mixture is catalyzed with 1%- >2%, by weight, of organic peroxide, specifically, methyl ethyl ketone peroxide -9. Such a material is available from Superior Fiberglass and Resins, 28852 Phillips St., Elkhart, Ind. 46514, as product name "CADOX" "L-50 CL" and "L-50 RD." Prior to completion of catalysis, the previously described material is in a heavily viscous, liquid form. The liquid material is applied to a mold in a thin layer between 0.061-inch to 0.250-inch thick. Next, the intra-laminar matrix template as depicted in FIGS. 2–4 is applied over the still liquid material. In the preferred embodiment, this template would consist of a weave of fiberglass and graphite fiber in a proportion of approximately 66 percent fiberglass to 34 percent graphite. Ideally, the template would consist of 100 percent graphite fibers oriented biaxially. Such a material is available from Composite Materials, Inc., 720 Collins Road, Elkhart, Ind. 46516.

It is a major object of this invention that the fabric comprising the template be woven in such a fashion that the space between each group of respective elements in the weave be at least 0.010 inch and no greater than 0.0850-inch apart, thereby providing a dimensional profile to yield a void closely proximate to the formula "Inside Template Dimensions=Outside Matrix Dimensions." The template is applied in such a fashion as to allow the liquid to permeate throughout the fabric. Next, a subsequent layer of the material previously described above is over the intra-laminar matrix template. Upon completion of catalysis, a homogeneous composite material with a structural intra-laminar matrix is produced.

FIG. 5 shows a plurality of delamination points in the bonding structure of two composite layers 32, 34 joined by a bond 36. Specifically, delamination can occur interlaminarly along at least two fault points/planes 37, 38 for every single bond joining two discrete composite layers.

FIG. 6 shows mechanical test results of a composite of the prior art. Importantly, this exemplary prior art composite lacks the intralaminar matrix structure of the present invention, which provides significantly enhanced mechanical properties as shown in FIG. 7. A summary graphical and numerical representation of the test results of FIGS. 6 and 7 are shown in FIG. 8, which provides a comparison between the prior art composite and the composite of the present invention. The results tabulated in FIG. 7 were obtained from the ASTM-certified labs of Strongwell Corporation, 400 Commonwealth Avenue, Bristol, Va. 24203-0580.

Additional embodiments are possible, for example, materials other than those described in the typical and preferred embodiments above may be used. For example, materials other than those described may be used, such as the addition of or replacement by other polymers or minerals with respect to the liquid mixture outlined earlier in this patent. Additionally, other catalytic agents may be employed. More importantly, other template weaves may be employed in order to achieve a variety of geometric shapes other than that specifically outlined in this patent. For example, the weave may be structured in such a manner that, when utilized, it yields individual matrix components of virtually any polyhedral shape.

The following advantages are thus provided by this invention for producing an intra-laminar structural matrix within homogeneous components become evident, including:

(a) a mechanical method for creating an intra-laminar structural matrix within a homogeneous composite layer is provided and a composite made thereby;

(b) a method of enhancing the mechanical performance characteristics of a homogeneous layer via modification of said homogeneous composite layer is provided and a composite made thereby;

(c) a method of creating a true three-dimensional bond, thus significantly advancing the state of the art of bond technology with respect to composite materials is provided and a composite made thereby; and (d) a method of reducing or, in some cases, eliminating sets of co-planar surfaces that require bonding, thus significantly reducing opportunities for potential inferior bond integrity and subsequent delamination of the composite is provided and a composite made thereby.

Accordingly, the inventors of the present invention conceived this new composite technology as a method for constructing highly reliable, high strength composites to be utilized as the primary material of which to construct, for example, large industrial building panels without the well known and, unacceptable problem of delamination. An exemplary application is the design and construction of a large 8 foot by 24 foot unitary panel with which to construct industrial buildings. Clearly, this invention lends itself to application in a wide variety of areas, for example, it is a superior material from which to construct what are referred to as Structural Insulated Panels (knows as "SIP's"). These panels are utilized to. build houses, soundproof rooms and structures that require a high degree of electrical or magnetic transparency, for example, as structures that house communications equipment. Other applications within and outside of the structures and construction fields will be apparent to the skilled artisan.

Although particular embodiments of the invention have been disclosed in detail for illustrative purposes, it will be recognized that variations or modifications of the disclosed method and apparatus produced thereby lie within the scope of the appended claims and their legal equivalents.

We claim:

1. A method of manufacturing a three-dimensional composite construction comprising the steps of:

initiating catalysis of a polyester resin mixture:

prior to completion of catalysis, applying the polyester resin mixture to a forming mold:

applying an intra-laminar matrix template to said mixture, said intra-laminar matrix template having two sides with void spaces provided therein extending from one side of said template to the other side through which a polymeric resin will flow, wherein said intra-laminar matrix template is provided as a woven fabric with a weave having a range of about 0.010 to about 0.10 inch tuft separation and said void spaces are uniformly filled with said polyester resin mixture extending through said void spaces and along both said sides; and completing catalysis of the polyester resin mixture to achieve a homogeneous composite structure.

2. The method of claim 1 comprising the additional step of including organic peroxide in the polyester resin mixture in about a 1%-2% by weight ratio.

3. The method of claim 1 wherein the catalyst is organic peroxide.

4. The method of claim 1 wherein the polyester resin includes the mineral calcium meta-silicate.

5. The method of claim 4, providing an aspect ratio of calcium meta-silicate in the polymeric resin mixture in the range of about 15:1 to about 20:1.

* * * * *